United States Patent [19]

Oestreich

[11] 4,366,667
[45] Jan. 4, 1983

[54] METHOD AND DEVICE FOR MANUFACTURING A STRANDED UNIT

[75] Inventor: Ulrich Oestreich, Munich, Fed. Rep. of Germany

[73] Assignee: Siemens Aktiengesellschaft, Berlin & Munich, Fed. Rep. of Germany

[21] Appl. No.: 225,734

[22] Filed: Jan. 16, 1981

[30] Foreign Application Priority Data

Jan. 24, 1980 [DE] Fed. Rep. of Germany ....... 3002523

[51] Int. Cl.³ ..................... H01B 13/24; H01B 13/04
[52] U.S. Cl. ......................................... 57/7; 57/293; 57/297; 264/174
[58] Field of Search ..................... 57/7, 293, 294, 295, 57/297, 3, 6; 264/174, 103

[56] References Cited

U.S. PATENT DOCUMENTS

| | | | |
|---|---|---|---|
| 3,187,495 | 6/1965 | Christian, Jr. | 57/293 |
| 3,847,190 | 11/1974 | Forester | 57/293 X |
| 4,017,579 | 4/1977 | Roe et al. | 57/7 X |
| 4,056,925 | 11/1977 | Vogelsberg | 57/293 |

FOREIGN PATENT DOCUMENTS 2723659 11/1978 Fed. Rep. of Germany .
2735476 2/1979 Fed. Rep. of Germany .

Primary Examiner—John Petrakes
Attorney, Agent, or Firm—Hill, Van Santen, Steadman, Chiara & Simpson

[57] ABSTRACT

A method and device for producing a stranded unit having a bundle of stranded elements each consisting of at least one light waveguide covered by a sheath with the elements being twisted alternately with a right-hand twist and a left-hand twist to form a bundle covered with an outer jacket characterized by forming the bundle of the stranded elements and moving the bundle through a guide tube to prevent unraveling and untwisting, extruding an outer jacket surrounding the guide tube and pulling the jacket longitudinally along the axis of the guide tube to reduce the diameter jacket and cooling the jacket. The inside diameter of the jacket is reduced to such degree that as the portion of the jacket is pulled off of the guide tube, it will assume the functions of the guide tube for the bundle of twisted elements. The device includes an arrangement for creating the twist of the elements and an extrusion head for forming the jacket surrounding the guide tube which preferably includes an arrangement which has a nozzle acting as a stranding die for introducing a filling material between the stranded elements.

17 Claims, 2 Drawing Figures

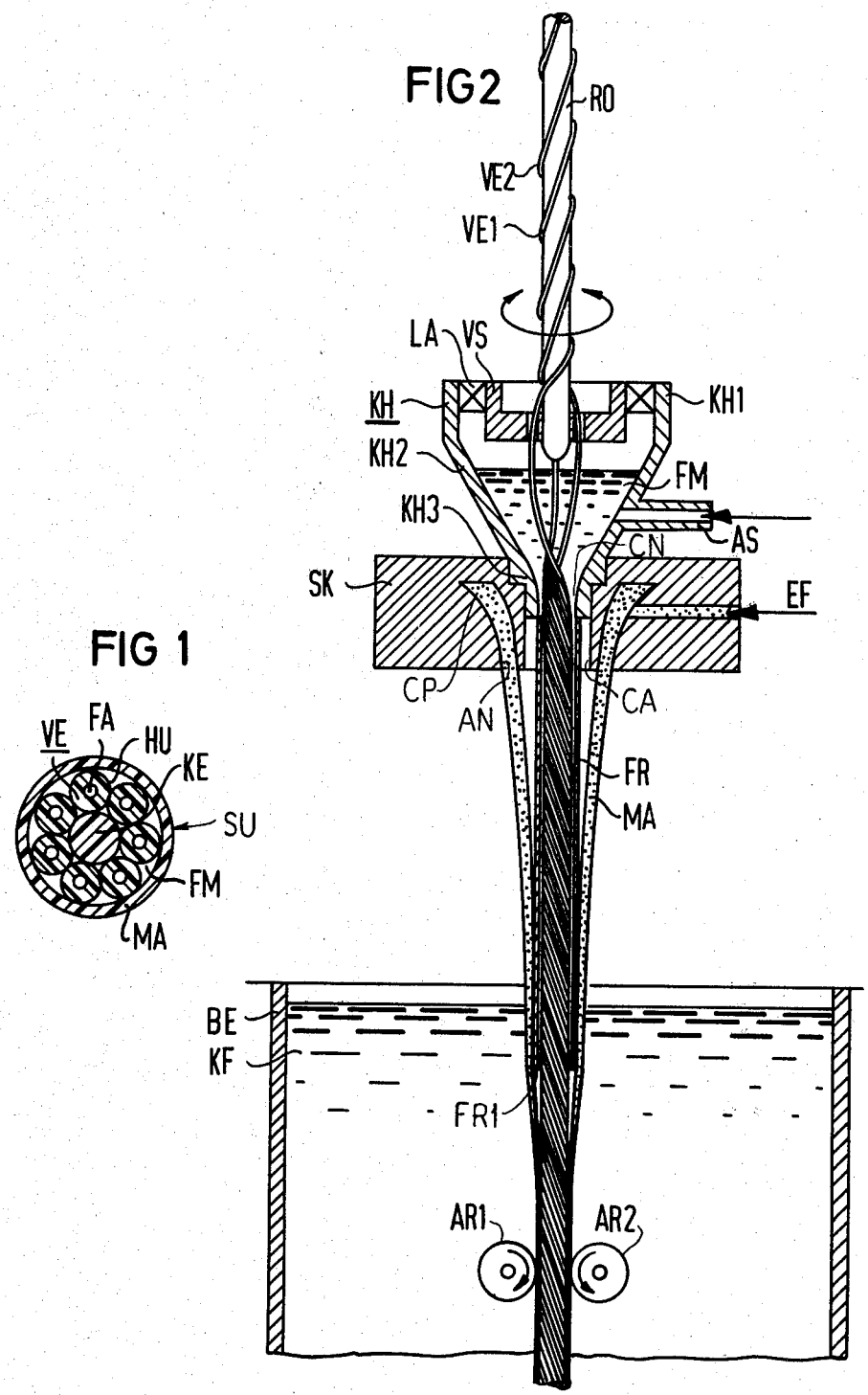

METHOD AND DEVICE FOR MANUFACTURING A STRANDED UNIT

BACKGROUND OF THE PRESENT INVENTION

The present invention is directed to a method and device for manufacturing a stranded unit whose stranded element each consists of at least one light waveguide surrounded by a sheath and are twisted in alternate directions to form a bundle with an "SZ" pattern which bundle is covered by an outer jacket.

When cabling individual elements into a bundle, a danger, which is that the ends of the bundles will become unraveled, always is present. When the individual elements are combined into an "SZ" pattern of the so-called "SZ" cabling method wherein the elements are alternately twisted in two directions, this danger exists along the entire length of the cable because of the reversing locations or points, which is where the twist direction is changed, can be viewed as the ends of each stranded bundle.

It is known from German O.S. No. 27 23 659 to secure optical communication cables in their stranded state by means of spinning a retaining spiral over the cable and particularly in the direct proximity of the stranding or reversing points. Since the retaining spirals must be seated more or less firmly at least to a certain degree on the individual, cushioned light waveguides, a danger, however, exists that the fibers will be mechanically stressed in the undesirable manner.

The method for manufacturing cables and lines with stranded elements laid in a "SZ" pattern is known from the German O.S. No. 27 35 476, which discloses that the elements are alternately stranded or twisted with a left-hand twist referred to as a "S" twist and then a right-hand twist referred to as a "Z" twist. The German O.S. also discloses a special measure which prevents unraveling. In detail, this is carried out in such a manner by an auxiliary outlet in the form of a disk being provided following the "SZ" cabling device and by the auxiliary outlet being followed by an extruder which coats the stranded elements with a synthetic covering. Since a danger exists that the force causing the unraveling will press the synthetic covering, which is still soft, radially outward as the covering leaves the output of the extruder, a supporting tubular passage is provided at the outlet of the extruder. The inside diameter of this passage is matched to the outside diameter of the extruded jacket or covering and this passage is water cooled. This water cooled passage is then followed by a water cooling basin so that the unraveling of the elements is largely prevented. Thus, in this embodiment, the jacket, which has already been extruded on the bundle of twisted elements, is conducted in a tube that forms the supporting passage.

SUMMARY OF THE INVENTION

The present invention is directed to providing a simple method and device for manufacture of the optically stranded units which are laid in an "SZ" pattern so that the bundle of the stranded elements has an alternate twist in alternate directions.

To accomplish these tasks, the invention is directed to a method for manufacturing a stranded unit composed of the stranding elements with each element consisting of at least one light waveguide covered by a sheath, said stranding elements being twisted alternately with a left-hand twist and a right-hand twist to form a bundle of stranded elements which is covered by an outer jacket. The method comprises stranding a plurality of elements to form a bundle of stranded elements with the alternate directions of twist, moving the bundle through a guide tube to prevent unraveling of the elements, extruding an outer jacket to surround the guide tube at a distance from the end of the guide tube, pulling the extruded outer jacket in a direction along the axis of the guide tube to reduce the inside diameter of the jacket to such a degree that it is substantially the same as the inside diameter of the guide tube, said step of moving the bundle inserting the bundle into said jacket as the bundle exits the guide tube with the jacket then assumed the function of the guide tube, and cooling the jacket during the step of pulling.

In the inside of the guide tube, the stranded bundle of elements is prevented from untwisting or unraveling because the inside diameter of the guide tube is only slightly larger than the outside diameter of the bundle and preferably only 10–40% larger. Fundamentally, the unraveling would be possible at the end of the guide tube but since the diameter of the jacket has in the meantime been reduced to such a degree and moreover is sufficiently cooled that it nearly achieves the diameter of the guide tube, an unraveling or fly out is prevented.

To perform the method, the invention is also directed to a device for stranding a plurality of stranded elements with each element having at least one light waveguide in a sheath into a bundle having alternate right-hand and left-hand twists and inserting the bundle into the outer jacket. The device includes means for alternately stranding the elements into a bundle having a right-hand and left-hand twist, means for producing an outer jacket for receiving the bundle of stranded elements including an injection head having an annular extrusion nozzle surrounding a central aperture, a guide tube with means supporting said guide tube coaxially within the annular nozzle to receive the moving bundle of the elements, and means for pulling the jacket along the tube and onto the bundle exiting the tube so that the outer jacket extruded by the nozzle surrounds said guide tube and then moves onto the bundle.

The means for stranding includes stranding disc and stranding point which are expediently placed in the direct proximity of the guide tube which partially thermally insulates the elements in turn from any penetration of the heat from the injection head.

BRIEF DESCRIPTION OF THE DRAWINGS

FIG. 1 is a cross-sectional view of a stranded unit produced in accordance with the present invention; and FIG. 2 is a device for producing the stranded unit illustrated in FIG. 1 in accordance with the present invention.

DESCRIPTION OF THE PREFERRED EMBODIMENTS

The principles of the present invention are particularly useful for producing a stranded unit generally indicated at SU and illustrated in cross-section in FIG. 1. The stranded unit SU has a core KE, which is surrounded with a plurality of stranding elements VE which are illustrated as seven elements. Each of the stranding elements VE is composed of a light waveguide fiber FA surrounded by a sheath HU, which acts as a cushioning means. The stranding elements VE are held together at the outside by means of a jacket MA which is extruded onto the bundle of stranded elements VE in a manner described in greater detail with respect to FIG. 2. The jacket MA surrounds the bundle so loosely on the one hand that the advantage of a loose sheaths HU are retained for the bundle as a whole and yet the jacket MA is sufficiently tight on the other hand that the bundle cannot unravel. The interspaces, gaps or spaces between the individual stranding elements VE are filled with a filling compound FM whose insertion is likewise explained in greater detail in FIG. 2. The unit SU with further outer sheathings or jackets can then be directly employed as a cable. However, it is also possible to employ this unit SU as an element which is connected with other similar elements in a stranded manner to form a cable of stranded bunches. In both cases, the jacket MA assumes the function of retaining the spiral or twist of the elements VE and to prevent unraveling thereof.

In the stranding device illustrated in FIG. 2, the firmly encapsulated light waveguides or elements VE are unwound as stranding elements from spools which are not illustrated. For the purposes of simplification, only two stranding elements VE1 and VE2 are shown. The "SZ" stranding in the present example occurs with the assistance of the tube or magazine tube RO changing its direction of rotation after a length of time which exhibits the length corresponding to the number of turns per direction. In addition, the tube magazine RO can be constructed to enable conducting the core KE of FIG. 1 into the center of the twisted elements VE. The manner of stranding in the stranding device are known in the art and are described for example in the German A.S. No. 24 54 777. Thus, the tube RO rotated together with a stranding disk VS functions as a magazine for the "SZ" stranding. The stranding disc SZ is provided with an end of the tube RO inserted therein and the individual stranding elements such as VE1 through VEn being conducted through the axial bores of the disc VS. The stranding disc VS is supported via a bearing means LA in the top of a vessel-like container or support KH so that the disc rotates coaxially with the tube RO.

As illustrated, the vessel-like support KH has a funnel shape and is coaxial with the axis of the tube RO. The vessel KH has an upper cylindrical portion or piece KH1 which supports the bearing means LA. Adjacent the portion KH1, a funnel-shape transition piece KH2 tapers to a further cylindrical piece or nozzle KH3 which has a greatly reduced diameter. The partial piece KH3 serves as a stranding die or nozzle CN and has an inside diameter which corresponds to the outer diameter of the bundle of the stranded elements which is to be produced. For example, the bundle elements may be a bundle of three elements, a bundle of four elements or a bundle of seven elements, etc. If desired, the core KE of the bundle is also taken into consideration in determining the size of the nozzle CN.

A filling compound FM is advantageously supplied in the area of a transition piece KH2 by a connector AS. It is to be pointed out that the stranding expediently occurs in a vertical direction from the top towards the bottom so that the filling compound forms a corresponding supply in the inside of the conical transition piece KH2 and is drawn through the nozzle CN of the joining piece KH3 due to the longitudinal motion of the individual stranding elements VE1 through VEn. Thus, the individual gaps or spaces of the elements between the stranding elements are filled with the filling compound FM at the output of the joining piece KH3.

A guide tube FR is attached to the joining piece KH3 of the container KH. The tube or guide FR retains the bundle of strands in the configuration prescribed by the stranding means over a specific path. Both the container KH as well as the upper part of the guide tube FR are supported in a central aperture CA of an injection head SK. The injection head SK has a filling aperture EF extending in to a conical, tapering passage CP that terminates in an annular ejection nozzle AN which is concentric with the aperture CA and the tube FR. The stretchable, wall-stable, and oil resistance material which is still molecular fluoropolymer for example ECTFE supplied under pressure through the filling aperture EF to the passage CP for extrusion as a synthetic tube from the annular nozzle AN on a bottom surface of the head SK. The tube, which is injected through a conical passage CP of the nozzle AN, has a conical portion and eventually, is pulled into the jacket MA. As a result of the transverse contraction during the stretching operation, the jacket MA tapers greatly and approaches the final diameter which is selected in such a manner that the inside diameter of the jacket MA exhibits the smallest possible distance from the guidance FR at the lower end FR1 of the tube. The jacket MA serves as an outside sheath running into a container or basin BE, which is filled with a cooling liquid KF. The longitudinal force is exerted on the outside jacket by means of a speed control discharge.

Due to the guide tube FR, and if need be also due to the filling compound FM, which is in the space between the individual elements VE, the conductor bunch is fixed to some degree as it approaches the exit or lower end FR1 of the tube FR. Thus, unraveling of individual elements VE in a direction opposite to the original stranding direction is prevented by means of the jacket MA which has been greatly reduced in diameter and either firmly engages the bundle or is only slightly spaced a distance from the bunch of elements. The bundle of elements VE laid or twisted in an SZ pattern can be produced without requiring the introduction of additional retaining spirals for securing the twisted elements in a bundle. The jacket MA has solidified to such a degree at the end of the stretching process that given a relaxation of the twisted or stranded elements, the individual stranded elements can only move slightly towards the outside. The unraveling of the stranded elements can only move slightly towards the outside. The unraveling of the stranded elements is thus prevented in any case.

Two rollers AR1 and AR2 are provided in the container BE and pressed slightly against the jacket MA to inhibit the torsion of the finished jacket which is slightly connected to the SZ stranded elements and thus leads to a better exploitation of the contents of the tube magazine RO.

In the present example, more stranding elements are shown in the schematic illustration on the inside of the guide tube FR than are shown on the tube magazine RO where only two such elements are illustrated for purposes of simplification. The inside diameter of the guide tube FR should be approximately 10–40% larger than the outside diameter of the bundle of stranded elements VE. The inside diameter of the finished jacket MA is selected somewhat greater than the outside diameter of the bundle at the end FR1 of the guide tube. By having the exit end FR1 inserted into the bath or fluid KF, the cooling of the jacket MA by the cooling fluid KF will begin before the jacket passes the end FR1 of the guide FR.

Although various minor modifications may be suggested by those versed in the art, it should be understood that I wish to embody within the scope of the patent granted hereon, all such modifications as reasonably and properly come within the scope of my contribution to the art.

I claim:

1. A method for manufacturing a stranded unit composed of stranding elements with each element consisting of a least one light waveguide covered by a sheath, said stranding elements being twisted alternately with a left-hand twist and a right-hand twist to form a bundle of a stranded element which is covered by an outer jacket, said method comprising the steps of stranding a plurality of elements to form a bundle of stranded elements with the alternate directions of twist, moving the bundle through a guide tube having an exit end to prevent unraveling of the elements, extruding an outer jacket to surround the guide tube at a distance from the exit end of the guide tube, and pulling the extruded outer jacket in an axial direction along the guide tube to reduce the inside diameter of the jacket to such a degree that it is substantially the same as the inside diameter of the guide tube, said step of moving the bundle including inserting the bundle in said jacket as the bundle exits the exit end of the guide tube with the jacket then assuming the function of the guide tube and cooling the jacket during the step of pulling.

2. A method according to claim 1, wherein the steps of stranding the elements, extruding and pulling are accomplished around a vertical axis so that the bundle is moving downward in a vertical direction during said steps.

3. A method according to claim 1, wherein the step of cooling begins at the beginning of the step of pulling so that the jacket is being cooled as it is moving along an outer surface of the guide tube.

4. A method according to claim 1, wherein the stranded bundle of elements exiting from the guide tube has an outer diameter approximately 10 to 40% smaller than the inside diameter of the guide tube.

5. A method according to claim 1, wherein the final step of pulling the jacket to a final diameter draws the jacket to a diameter somewhat greater than the outside diameter of the stranded bundle leaving the guide tube.

6. A method according to claim 1, which includes drawing the unit of the bundle and outer jacket after the unit has exited the tube through a cooling medium and engaging the unit of the jacket and bundle with friction rollers to prevent transfer of torsional forces while in the cooling medium.

7. A method according to claim 1, which includes filling the spaces between the stranded elements with a filling compound as the bundle of stranded elements moves into the guide tube.

8. A method according to claim 7, wherein the step of filling comprises providing a container having an output aperture acting as a stranding die and leading to the input of the guide tube, said step of filling includes supplying a filling compound to the container as the bundle moves therethrough and into the guide tube.

9. A device for stranding a plurality of stranding elements each composed of at least one light waveguide in a sheath into a bundle having an alternately right-hand twist and left-hand twist, and inserting the bundle into an outer jacket, said device including means for alternately stranding the elements into a bundle having right-hand and left-hand twists, means for producing an outer jacket for receiving the bundle of stranded elements including an injection head having an annular extrusion nozzle surrounding a central aperture, and a guide tube with means supporting said guide tube at the aperture and coaxially within the annular nozzle to receive the moving bundle of elements, means for pulling the jacket along an outer surface of the tube and around the bundle leaving an exit end of the tube so that an outer jacket extruded by said nozzle surrounds said guide tube and moves onto the bundle.

10. A device according to claim 9, which includes means for introducing a filling compound in the spaces between the stranded elements, said means including a funnel-shaped container for receiving said compound and terminating in a nozzle acting as a stranding die for said means for stranding as the bundle passes through said container.

11. A device according to claim 10, wherein the nozzle of said container is mounted in said aperture of the injection head.

12. A device according to claim 10, wherein the guide tube is secured to the nozzle of said container.

13. A device according to claim 12, wherein the nozzle of said container is held in the aperture of said injection head and acts as said means for supporting said guide tube coaxially with said annular nozzle.

14. A device according to claim 9, wherein the means for stranding includes a tube magazine being alternately rotated in opposite direction for stranding elements, a stranding disc receiving an end of said tube magazine, and bearing means for supporting said stranding disc for rotation.

15. A device according to claim 14, which includes means for applying a filling compound between the spaces of said stranded elements, said means including a funnel-shaped container terminating in an annular nozzle acting as a stranding die, the opposite end of said container supporting said bearing means for the stranding disc.

16. A device according to claim 15, wherein the nozzle of said container is held in the aperture of the injection head.

17. A device according to claim 15, wherein the guide tube is secured to the nozzle of the container, said nozzle being received in the aperture of the injection head and acting as the means for supporting said guide tube.

* * * * *